(12) United States Patent
Kim et al.

(10) Patent No.: US 12,093,526 B2
(45) Date of Patent: Sep. 17, 2024

(54) PERFORMANCE OPTIMIZATION DEVICE OF MEMORY SYSTEM AND OPERATING METHOD THEREOF

(71) Applicant: SK hynix Inc., Gyeonggi-do (KR)

(72) Inventors: Ki Tae Kim, Gyeonggi-do (KR); Seon Ju Lee, Gyeonggi-do (KR); In Ho Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 120 days.

(21) Appl. No.: 17/725,684

(22) Filed: Apr. 21, 2022

(65) Prior Publication Data

US 2023/0144376 A1    May 11, 2023

(30) Foreign Application Priority Data

Nov. 11, 2021  (KR) .......................... 10-2021-0154794

(51) Int. Cl.
    *G06F 3/06*          (2006.01)

(52) U.S. Cl.
    CPC .......... *G06F 3/0604* (2013.01); *G06F 3/0611* (2013.01); *G06F 3/0655* (2013.01); *G06F 3/0679* (2013.01)

(58) Field of Classification Search
    None
    See application file for complete search history.

(56) References Cited

U.S. PATENT DOCUMENTS

| 8,499,201 B1 * | 7/2013 | Chiu ................... G06F 11/3471 |
| | | 714/42 |
| 10,740,695 B2 | 8/2020 | Cheng et al. |
| 10,853,283 B1 * | 12/2020 | Drown .................. G06F 3/0671 |
| 2004/0193397 A1 * | 9/2004 | Lumb .................. G06F 13/105 |
| | | 703/24 |
| 2018/0349158 A1 * | 12/2018 | Swersky ................ G06N 20/00 |
| 2021/0081842 A1 | 3/2021 | Polleri et al. |
| 2022/0374059 A1 * | 11/2022 | Xiong .................. G06F 1/3275 |
| 2022/0374166 A1 * | 11/2022 | La Fratta ............... G06F 3/0673 |
| 2023/0045254 A1 * | 2/2023 | Xiu ..................... G06F 11/0721 |

FOREIGN PATENT DOCUMENTS

| KR | 10-1361670 B1 | 2/2014 |
| KR | 10-2021-0050892 A | 5/2021 |

OTHER PUBLICATIONS

Bayesian Optimization ConceptExplained in Layman Terms; by Wei Wang; pp. 14; May 18, 2020 (Year: 2020).*
Definition "natural numbers" Google pp. 3 (Year: 2023).*

* cited by examiner

Primary Examiner — Kaushikkumar M Patel
(74) Attorney, Agent, or Firm — IP & T GROUP LLP

(57) ABSTRACT

A method for operating a performance optimization device of memory system is provided, the method including determining N, where N is a natural number greater than 0, candidate performance parameter values for a performance parameter of the memory system; calculating N objective function results for an objective function defined for the memory system; and determining an additional candidate performance parameter value for the performance parameter of the memory system, based on the N candidate performance parameter values and the N objective function results.

16 Claims, 13 Drawing Sheets

FIG. 10

OBJ_FUNC(X1), OBJ_FUNC(X2), ···
OBJ_FUNC(XN-1), OBJ_FUNC(XN)

OBJ_FUNC(XN+1)

⇒ determine an optimal value of the performance parameter min(OBJ_FUNC(X1), OBJ_FUNC(X2), ··· OBJ_FUNC(XN-1), OBJ_FUNC(XN))

OR search a separate candidate performance parameter value XN+2

PERFORMANCE OPTIMIZATION DEVICE OF MEMORY SYSTEM AND OPERATING METHOD THEREOF

CROSS-REFERENCES TO RELATED APPLICATION

This application claims priority to Korean patent application number 10-2021-0154794 filed on Nov. 11, 2021, which is incorporated herein by reference in its entirety.

TECHNICAL FIELD

Various embodiments of the present disclosure generally relate to a performance optimization device of memory system and an operating method thereof.

BACKGROUND

A memory system includes a data storage device that stores data on the basis of a request from a host, such as a computer, servers, a smartphone, a tablet PC, or other electronic devices. Examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling a memory device. The memory controller may receive a command from the host and, on the basis of the received command, may execute the command or control read/write/erase operations on the memory devices in the memory system. The memory controller may be used to execute firmware operations for performing a logical operation for controlling such operations.

The performance of operation of memory system may be determined by performance parameter of the memory system. Generally, an engineer developing the memory system may determine optimal value of the performance parameter of the memory system manually by directly analyzing the logical relationship between the performance parameter of the memory system and the performance of operation of the memory system. However, when an engineer determines the optimal value of the performance parameter of the memory system directly, it takes long time for optimization and there may be variations in the degree of optimization depending on the engineer.

SUMMARY

Various embodiments of the present disclosure are directed to a performance optimization device of memory system and an operating method thereof, capable of determining optimal value of the performance parameter of the memory system quickly.

In addition, various embodiments of the present disclosure are directed to a performance optimization device of a memory system and operating method thereof, capable of minimizing variations in the degree of optimal value of the performance parameter of the memory system.

In one aspect, embodiments of the present disclosure may provide a method for operating a performance optimization device of a memory system, the method including i) determining N, where N is a natural number, candidate performance parameter values for a performance parameter of the memory system; ii) calculating N objective function results for an objective function defined for the memory system; and iii) determining an additional candidate performance parameter value for the performance parameter of the memory system, based on the N candidate performance parameter values and the N objective function results.

In this case, each of the N objective function results may be the result of the objective function, the result being measured when a corresponding one of the candidate performance parameter values is applied to the memory system. The objective function may be a function of i) an average of a plurality of latencies required for the memory system to process a plurality of commands received from an external device and ii) a maximum value of the plurality of latencies.

In another aspect, embodiments of the present disclosure may provide a performance optimization device of a memory system, including i) a storage memory for storing N, where N is a natural number, candidate performance parameter values for a performance parameter of the memory system; and ii) a computing processor for calculating N objective function results for an objective function defined for the memory system and determining an additional candidate performance parameter value for a performance parameter of the memory system, based on the N candidate performance parameter values and the N objective function results.

In this case, each of the N objective function results may be a result of the objective function, the result being measured when a corresponding one of the candidate performance parameter values is applied to the memory system. The objective function may be a function of i) an average of a plurality of latencies required for the memory system to process a plurality of commands received from an external device and ii) a maximum value of the plurality of latencies.

In another aspect, embodiments of the present disclosure may provide a memory controller, including: i) a working memory for storing N candidate performance parameter values for a performance parameter of a memory system including the memory controller, where N is a natural number; and ii) a processor for calculating N objective function results for an objective function defined for the memory system and determining an additional candidate performance parameter value for a performance parameter of the memory system, based on the N candidate performance parameter values and the N objective function results.

In this case, each of the N objective function results may be a result of the objective function, the result being measured when a corresponding one of the candidate performance parameter values is applied to the memory system. The objective function may be a function of i) an average of a plurality of latencies required for the memory system to process a plurality of commands received from an external device and ii) a maximum value of the plurality of latencies.

According to embodiments of the present disclosure, it is possible to quickly determine an optimal value of the performance parameter of the memory system.

BRIEF DESCRIPTION OF THE DRAWINGS

FIG. 10 to FIG. 11 are diagrams illustrating the performance optimization device of memory system determining an optimal value of the performance parameter of the memory system based on an embodiment of the present disclosure.

DETAIL DESCRIPTION

Figure 1:
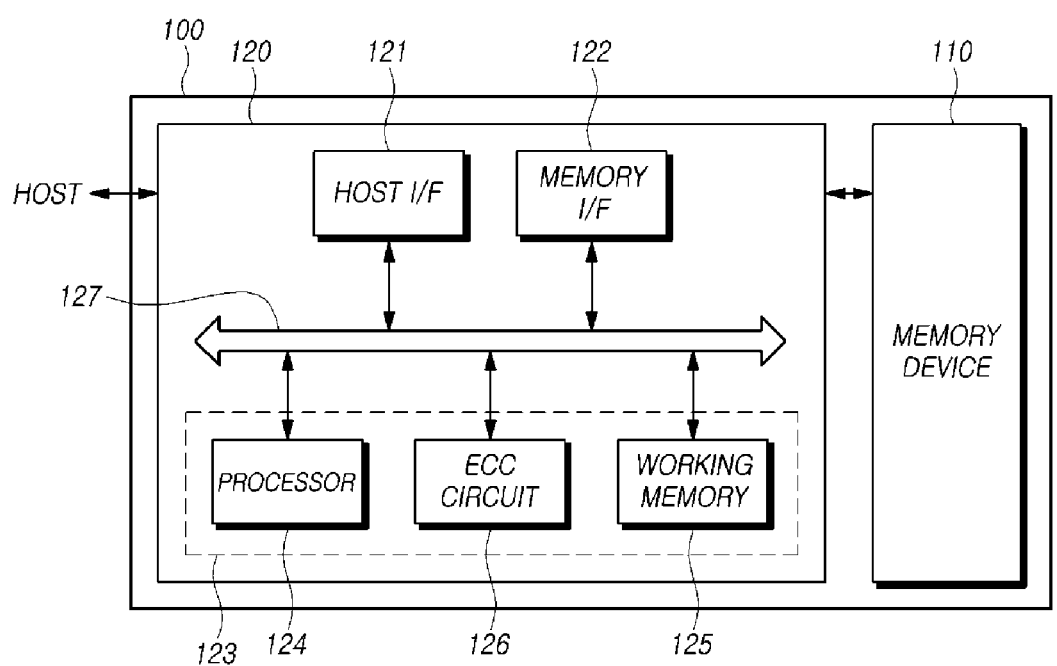
FIG. 1 is a schematic diagram illustrating a configuration of a memory system based on an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present disclosure are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating a schematic configuration of a memory system 100 based on an embodiment of the present disclosure.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host, when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host and to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. The processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the present disclosure, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check whether an error correction operation is needed on the next sector. Upon completion of the error detection and correction operations on all read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
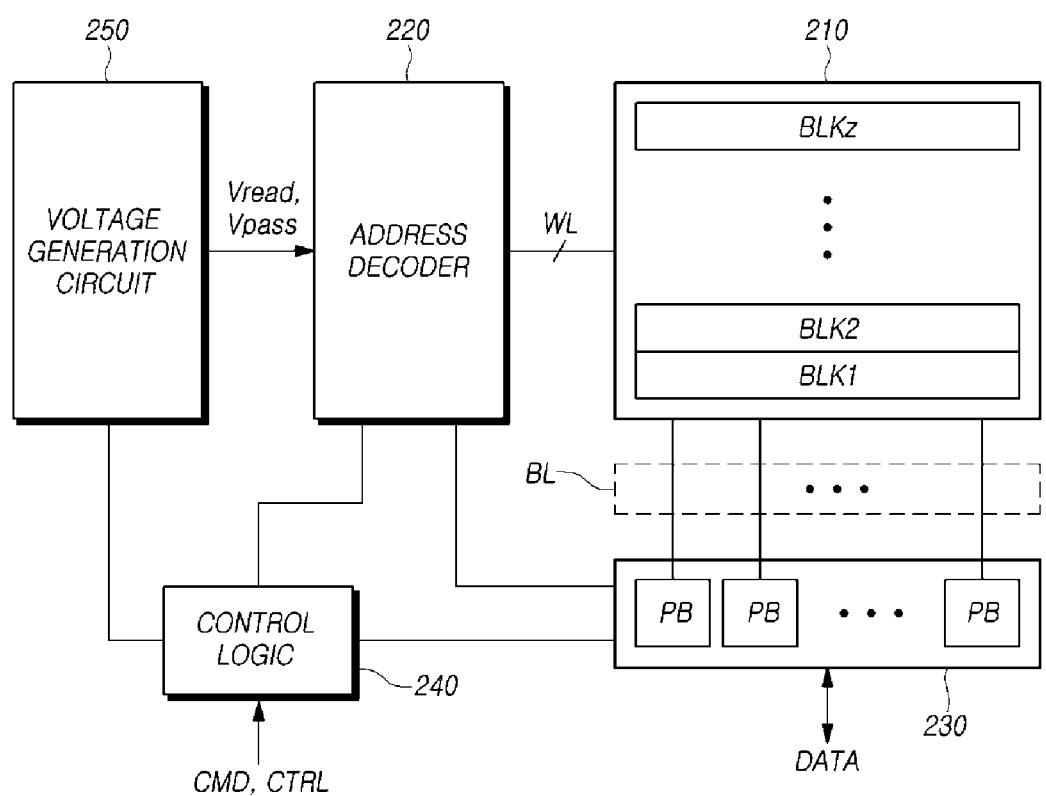
FIG. 2 is a block diagram schematically illustrating a memory device based on an embodiment of the present disclosure.

FIG. 2 is a block diagram schematically illustrating a memory device 110 based on an embodiment of the present disclosure.

In some implementations, the memory device 110 based on an embodiment of the present disclosure may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or greater than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
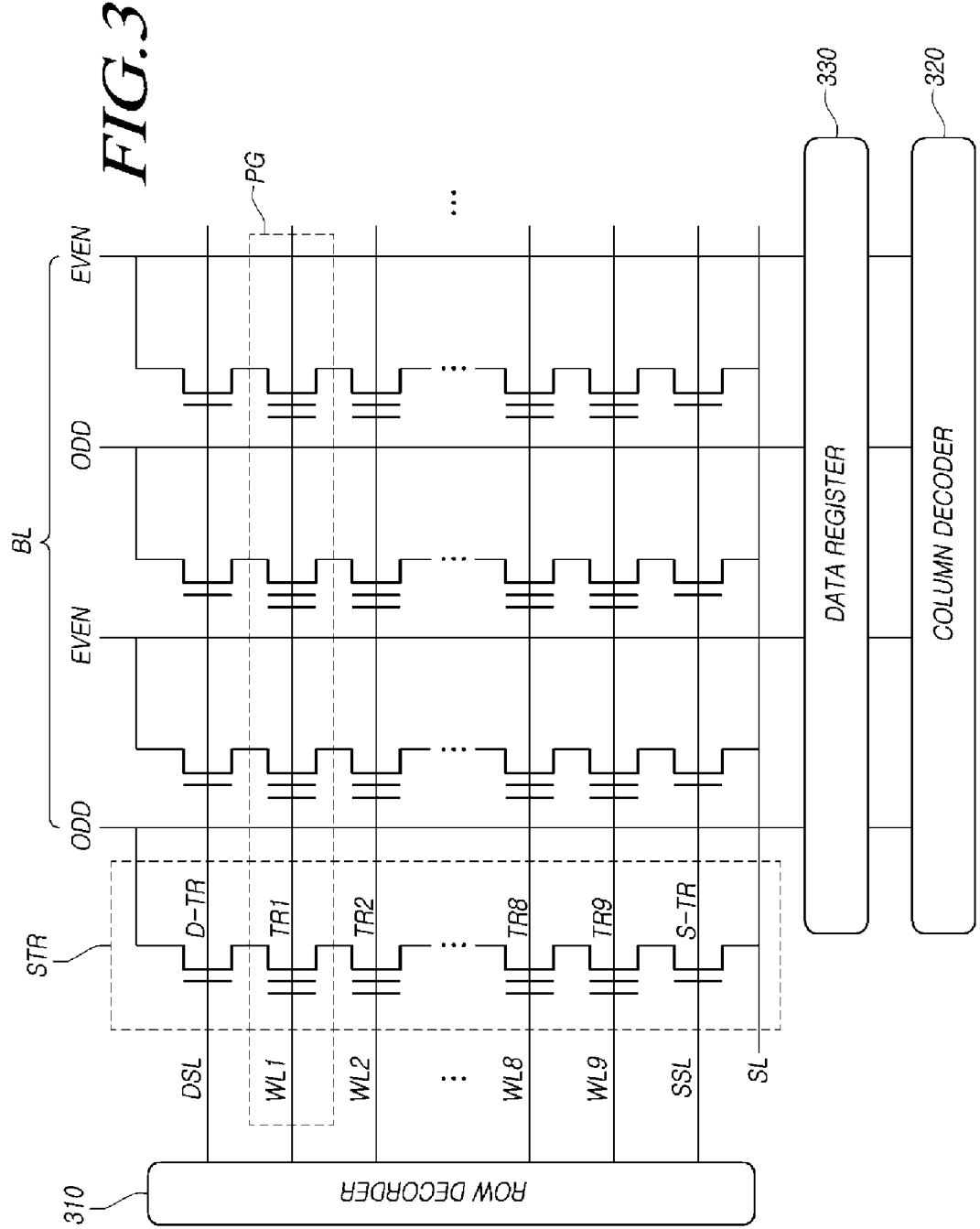
FIG. 3 is a diagram illustrating a structure of word lines and bit lines of a memory device based on an embodiment of the present disclosure.

FIG. 3 is a diagram illustrating a structure of word lines WL and bit lines BL of a memory device 110 based on an embodiment of the present disclosure.

Referring to FIG. 3, the memory device 110 has a core area in which memory cells MC are arranged, and an auxiliary area (the remaining area other than the core area) which includes circuitry that is used to perform the operations of the memory cell array 210.

In the core area, a certain number of memory cells arranged in one direction can be called a "page" PG, and a certain number of memory cells that are coupled in series can be called a "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of an odd-numbered bit line and an even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
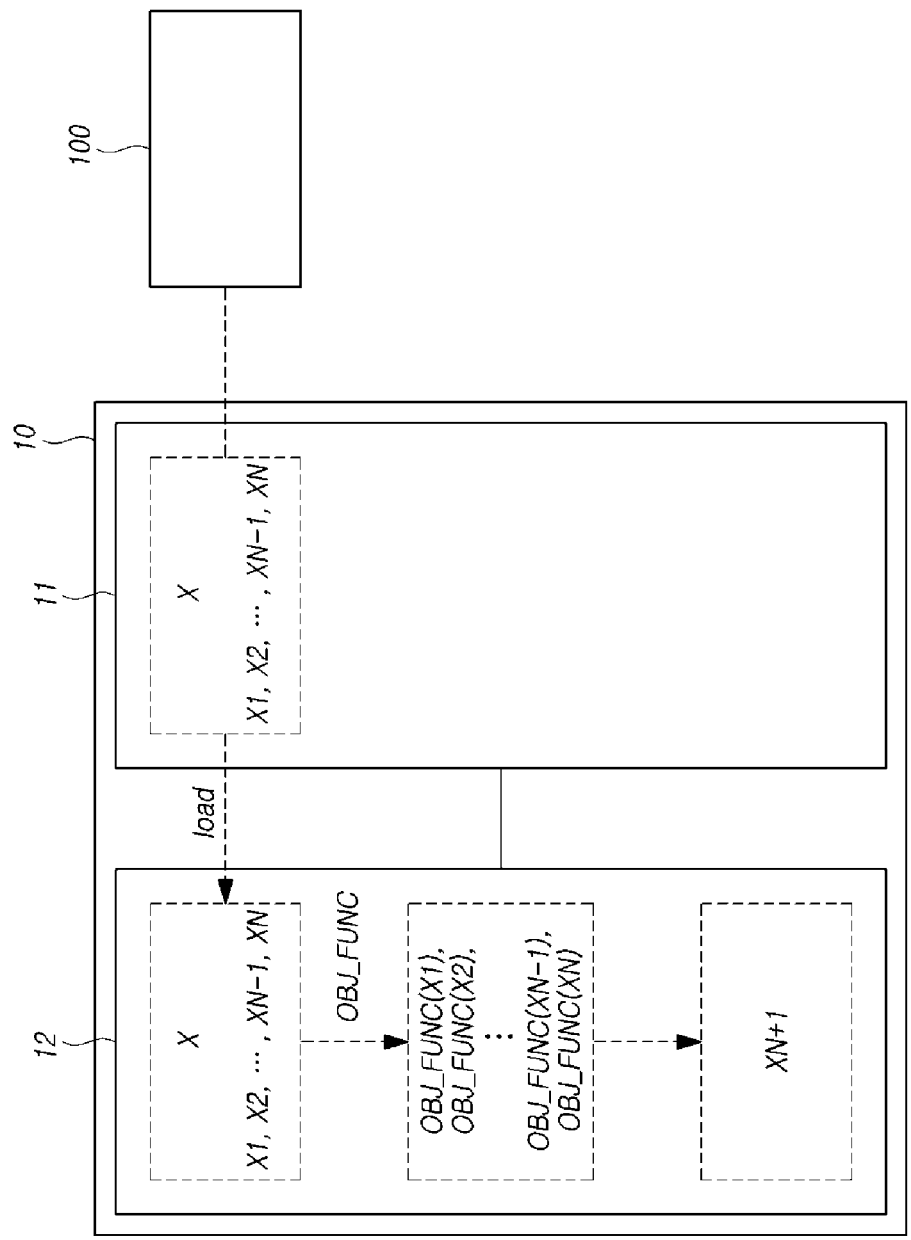
FIG. 4 is a diagram illustrating a schematic structure of a performance optimization device of memory system based on an embodiment of the present disclosure.

FIG. 4 is a diagram illustrating a schematic structure of a performance optimization device 10 of memory system 100 based on an embodiment of the present disclosure.

Referring to FIG. 4, the performance optimization device 10 of memory system 100 may include a storage memory 11 and a computing processor 12.

The storage memory 11 may store N, where N is a natural number, candidate performance parameter values X1, X2, ~, XN−1, XN for the performance parameter X of the memory system 100. The storage memory 11 may be volatile memory (e.g., SRAM, DRAM, SDRAM) or non-volatile memory (e.g., NAND flash).

At this time, N candidate performance parameter values X1, X2, ~, XN−1, XN may be randomly selected within a range of values that the performance parameter X of the memory system 100 may have.

The computing processor 12 may calculate N objective function results OBJ_FUNC(X1), OBJ_FUNC(X2), ~, OBJ_FUNC(XN−1), OBJ_FUNC(XN) for an objective function OBJ_FUNC(X) defined for the memory system. For this, the computing processor 12 may repeat the process or measuring the performance of operation of the memory system 100 after setting the performance parameter X of the memory system 100 to one of the aforementioned N candidate performance parameter values X1, X2, ~, XN−1, XN.

Each of the N objective function results OBJ_FUNC(X1), OBJ_FUNC(X2), ~, OBJ_FUNC(XN−1), OBJ_FUNC(XN) is the result of the objective function OBJ_FUNC(X) when measuring the memory system 100 by applying a corresponding one of the candidate performance parameter values X1, X2, ~, XN−1, XN to the memory system 100. The computing processor 12 may load the candidate performance parameter values X1, X2, ~, XN−1, XN from the storage memory 11 to calculate N objective function results OBJ_FUNC(X1), OBJ_FUNC(X2), ~, OBJ_FUNC(XN−1), OBJ_FUNC(XN).

The computing processor 12 may determine an additional candidate performance parameter value XN+1 for the performance parameter X of the memory system 100, based on the N candidate performance parameter values X1, X2, ~, XN−1, XN and N objective function results OBJ_FUNC(X1), OBJ_FUNC(X2), ~, OBJ_FUNC(XN−1), OBJ_FUNC(XN).

Like this, the performance optimization device 10 of memory system 100 may determine automatically the additional candidate performance parameter value XN+1 for the performance parameter X of the memory system 100, based on the N candidate performance parameter values X1, X2, ~, XN−1, XN and N objective function results OBJ_FUNC(X1), OBJ_FUNC(X2), ~, OBJ_FUNC(XN−1), OBJ_FUNC(XN) which are already measured. Therefore, compared to when an engineer directly analyzes the performance of the memory system 100 manually, the performance optimization device 10 of memory system 100 may determine the optimal value of the performance parameter X quickly and prevent the deviation from the optimal value of the performance parameter X.

The performance optimization device 10 of memory system 100 may be implemented, for example, as a separate computing device (e.g., PC, smartphone, tablet) which is connected to the memory system.

However, as another example, the memory controller 120 of the memory system 100 may operate as the performance optimization device 10 of memory system 100. In this case, the storage memory 11 may be the working memory 125 of the memory system 100, and the computing processor 12 may be the processor 124 of the memory system 100.

The performance parameter X of the memory system 100 may be one of various parameters that may affect the performance of operation of the memory system 100 according to a change in value.

For example, the performance parameter X may be a ratio between a usage rate of a write buffer included in the memory system 100 and an operating characteristic of the memory system 100 (e.g., delay used to output a completion signal for a command received from a host HOST). The memory system 100 may use a write buffer (not shown) to temporarily store data requested to be written by the host HOST before being stored in the memory device 110. For example, the write buffer may be located in a specific area inside the working memory 125 included in the memory system 100.

The memory system 100 may adjust the operating characteristic (performance parameter) of the memory system 100 to prevent the size of free space in the write buffer from being reduced when the usage rate of the write buffer increases. In this case, the relationship OP=X*WBU may be established with respect to the usage rate WBU of the write buffer, the operation characteristic OP of the memory system 100 and the performance parameter X.

As another example, the performance parameter X may be a speed of an operation clock which is inputted to components included in the memory system 100.

As another example, the performance parameter X may be a generation period of a status read message that the memory system 100 generates to check a result for an internal operation (e.g., read/write operation).

Figure 5:
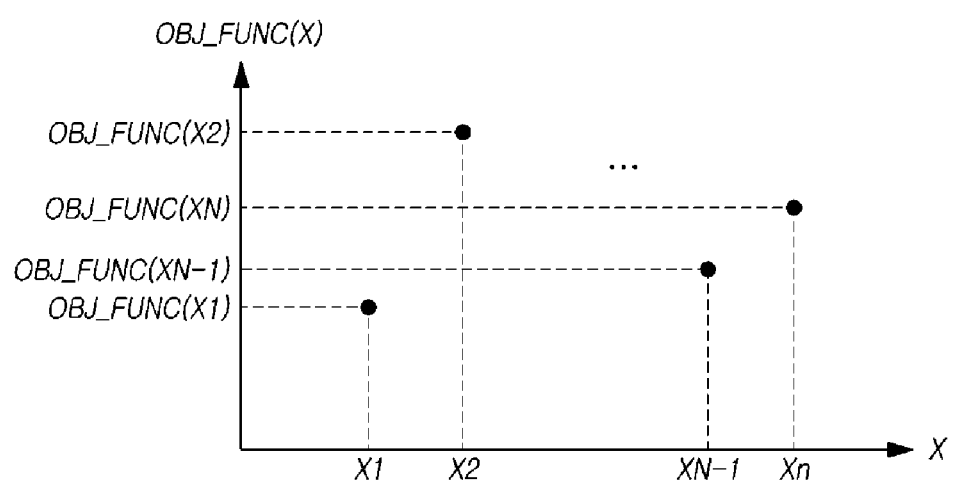
FIG. 5 is a diagram illustrating candidate performance parameter values and objective function results based on an embodiment of the present disclosure.

FIG. 5 is a diagram illustrating candidate performance parameter values X1, X2, ~, XN−1, XN and objective function results OBJ_FUNC(X1), OBJ_FUNC(X2), ~, OBJ_FUNC(XN−1), OBJ_FUNC(XN) based on an embodiment of the present disclosure.

Referring to FIG. 5, the candidate performance parameter values X1, X2, ~, XN−1, XN and objective function results OBJ_FUNC(X1), OBJ_FUNC(X2), ~, OBJ_FUNC(XN−1), OBJ_FUNC(XN) for the candidate performance parameter values X1, X2, ~, XN−1, XN may be calculated by the computing processor 12 described in FIG. 4. The objective function result for each of the candidate performance parameter values X1, X2, ~, XN−1, XN may be calculated by measuring the performance of operation of the memory system 100 after setting the performance parameter X of the memory system 100 as the corresponding candidate performance parameter value.

In an embodiment of the present disclosure, the performance optimization device 10 of memory system 100 may use objective function OBJ_FUNC(X) to determine the correlation between the performance parameter X of the memory system 100 and the performance of operation of the memory system 100 as accurately as possible. Accordingly, depending on how the objective function OBJ_FUNC(X) is set, the performance optimization device 10 of memory system 100 may determine the optimal value of the performance parameter X of the memory system 100 differently.

Figure 6:
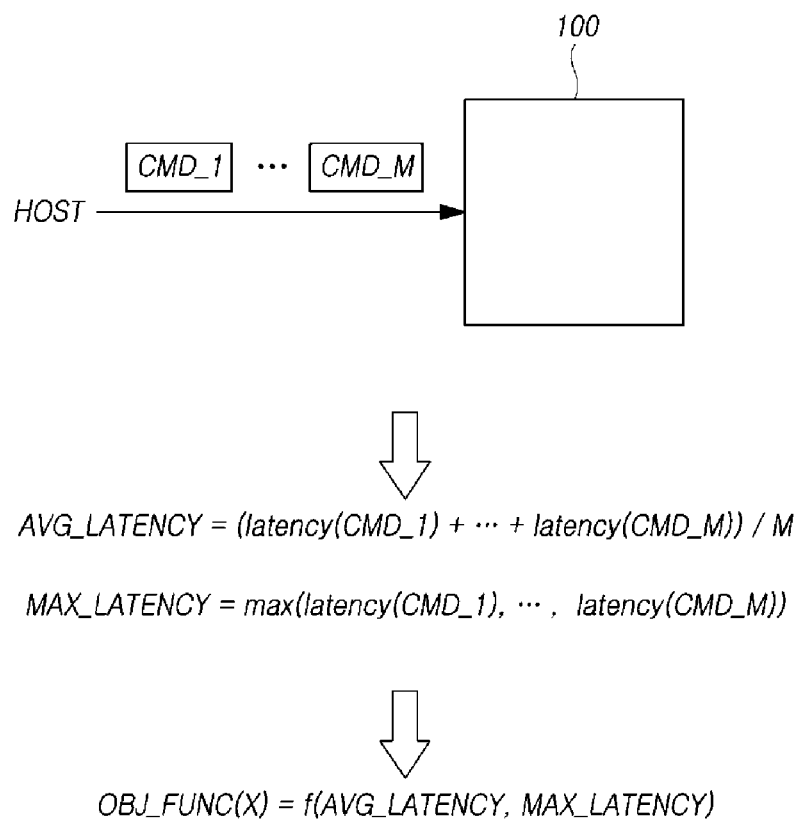
FIG. 6 is a diagram illustrating a form of objective function based on an embodiment of the present disclosure.

FIG. 6 is a diagram illustrating a form of objective function OBJ_FUNC(X) based on an embodiment of the present disclosure.

The memory system 100 may receive M, where M is a natural number greater than or equal to 2, commands CMD_1, ~, CMD_M for a set time period (e.g., 1 second) from an external device (e.g., HOST). At this time, the memory system 100 may measure latency for processing each of the M commands CMD_1, ~, CMD_M. Hereinafter, a case in which the external device that transmits the M commands CMD_1, ~, CMD_M to the memory system 100 is the host HOST will be described as an example, however the external device is not limited to the host HOST.

The latency for the command may be defined as the difference between i) the time point that the host HOST transmits the command to the memory system 100 and ii) the time point that the memory system 100 transmits the processing completion response for the command to the host HOST. For example, the host HOST transmits the command to the memory system 100 when 100 us has elapsed from the reference time, and the memory system 100 transmits the processing completion response for the command to the host HOST when 180 us has elapsed from the reference time. In this case, the latency for the command is 180 us−100 us=80 us.

The objective function OBJ_FUNC(X) may be function f(AVG_LATENCY, MAX_LATENCY) of i) an average AVG_LATENCY of a plurality of latencies latency (CMD_1), ~, latency(CMD_M) and ii) a maximum value MAX_LATENCY of the plurality of latencies latency (CMD_1), ~, latency(CMD_M).

The average AVG_LATENCY of a plurality of latencies latency(CMD_1), ~, latency(CMD_M) may be determined as (latency(CMD_1)+ . . . +latency(CMD_M))/M. For example, if M=1000000, the average AVG_LATENCY of a plurality of latencies latency(CMD_1), ~, latency(CMD_M) may be average of latencies of 1000000 commands.

The maximum value MAX_LATENCY of the plurality of latencies latency(CMD_1), ~, latency(CMD_M) may be determined as max(latency(CMD_1), ~, latency(CMD_M)). For example, if M=1000000, maximum value MAX_LATENCY of the plurality of latencies latency(CMD_1), ~, latency(CMD_M) may be the maximum value of latencies of 1000000 commands.

Like this, the reason why the objective function OBJ_FUNC(X) is defined as the function of i) an average AVG_LATENCY of a plurality of latencies latency (CMD_1), ~, latency(CMD_M) and ii) a maximum value MAX_LATENCY of the plurality of latencies latency (CMD_1), ~, latency(CMD_M) is as follows.

Main indicators for determining the performance of operation of the memory system 100 include a delay time and a throughput. The delay time may be defined as a time required for the memory system 100 to complete processing of a command received from the host HOST. The throughput may be defined as the performance of the memory system 100 processing a command received from the host HOST.

In this case, a trade-off relationship may be established between the delay time and the throughput. For example, the memory system 100 may internally suspend an erase operation when the memory system 100 receives a read command from the host HOST to reduce the delay time.

In this case, the memory system 100 may process the read command received from the host HOST more quickly, so that the delay time can be reduced. However, due to this, the time point that the erase operation is processed may be delayed, and thus the memory system 100 does not secure enough free memory block, and thus the throughput of the memory system 100 may decrease.

Accordingly, the performance optimization device 10 of memory system 100 needs to consider both the delay time and the throughput in order to determine the optimal value of the performance parameter X of the memory system 100.

At this time, the performance optimization device 10 of memory system 100 may define the delay time based on the maximum value MAX_LATENCY of the plurality of latencies latency(CMD_1), ~, latency(CMD_M).

And the performance optimization device 10 of memory system 100 may define the throughput based on the average AVG_LATENCY of a plurality of latencies latency (CMD_1), ~, latency(CMD_M) described above. For example, the throughput may be defined as a value inversely proportional to the average AVG_LATENCY of a plurality of latencies latency(CMD_1), ~, latency(CMD_M).

Therefore, in order to determine the optimal performance parameter that can decrease the delay time and increase the throughput at the same time, the objective function may be defined as a function that considers both the i) an average AVG_LATENCY of a plurality of latencies latency (CMD_1), ~, latency(CMD_M) and ii) a maximum value MAX_LATENCY of the plurality of latencies latency (CMD_1), ~, latency(CMD_M).

Similarly, the performance optimization device 10 of memory system 100 may perform optimization on the performance parameter X of the memory system 100 in consideration of two conflicting indicators. For example, with respect to two conflicting indicators 1) the failure detection accuracy and 2) the failure detection time, the performance optimization device 10 of memory system 100 may perform the optimization of performance parameter of the memory system 100 by defining objective function OBJ_FUNC(X) as a function of 1) the failure detection accuracy and 2) the inverse of the failure detection time.

Furthermore, the specific form of the above-described objective function OBJ_FUNC(X) may be variously determined.

For example, the objective function OBJ_FUNC(X) may be determined as a function representing a sum of i) a value obtained by multiplying the average AVG_LATENCY of a plurality of latencies latency(CMD_1), ~, latency(CMD_M) by a first weight W1 and ii) a value obtained by multiplying the maximum value of the plurality of latencies latency (CMD_1), ~, latency(CMD_M) by a second weight W2. That is, the objective function OBJ_FUNC(X) may be a function of the following form.

$$OBJ\_FUNC(X) = (W1)*(AVG\_LATENCY) + (W2)*(MAX\_LATENCY)$$

In this case, the value of the first weight W1 and the value of the second weight W2 may be determined, for example, to satisfy W1+W2=1 (e.g., W1=0.4/W2=0.6, W1=0.5/W2=0.5).

Figure 7:
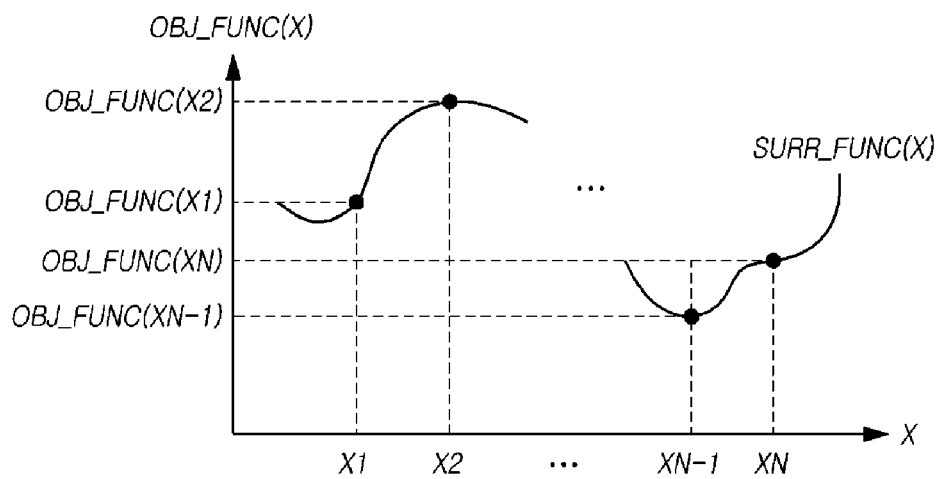
FIG. 7 to FIG. 9 are diagrams illustrating the performance optimization device of memory system determining a value of an additional candidate performance parameter value based on an embodiment of the present disclosure.
Figure 8:
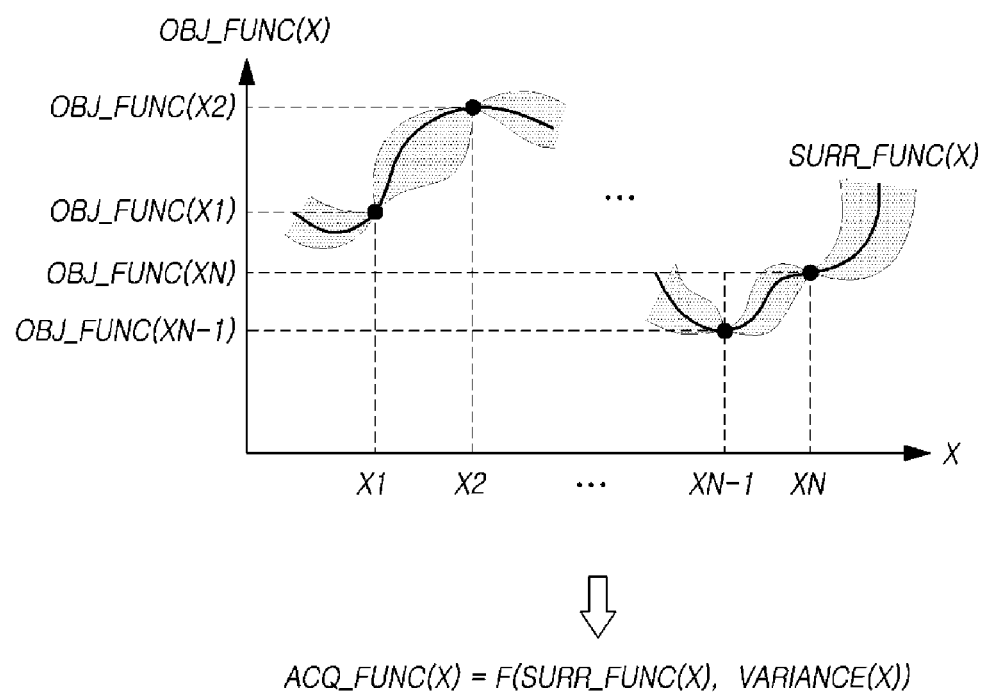
Figure 9:
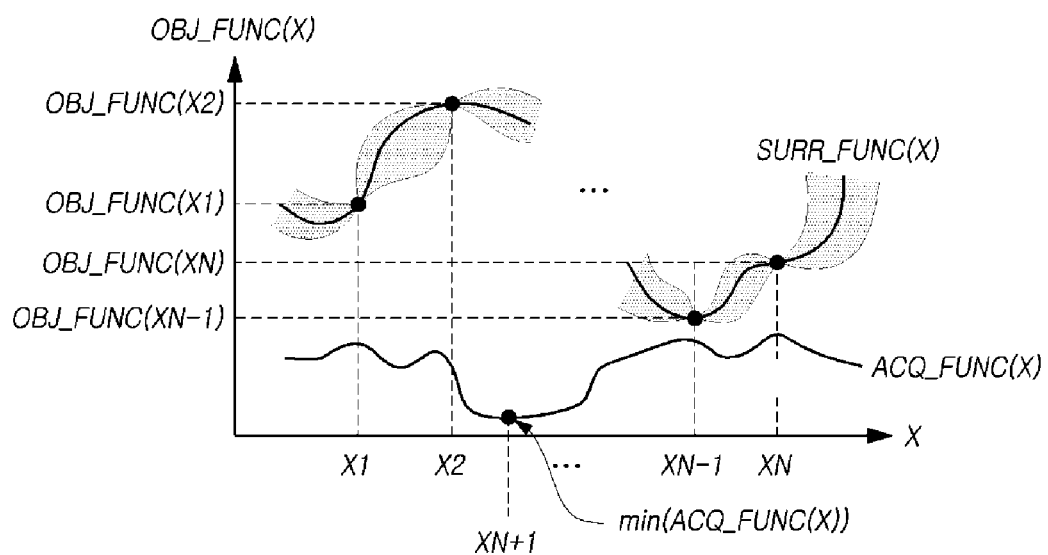

FIG. 7 to FIG. 9 are diagrams illustrating the performance optimization device 10 of memory system 100 determining value of an additional candidate performance parameter value XN+1 based on an embodiment of the present disclosure.

Referring to FIG. 7, the performance optimization device 10 of memory system 100 may set a surrogate function SURR_FUNC(X) and an acquisition function ACQ_FUNC(X) which are necessary to determine the value of the additional candidate performance parameter value XN+1.

The surrogate function SURR_FUNC(X) is a function estimated based on the aforementioned N candidate performance parameter values X1, X2, ~, XN-1, XN and N objective function results OBJ_FUNC(X1), OBJ_FUNC(X2), ~, OBJ_FUNC(XN-1), OBJ_FUNC(XN). The surrogate function SURR_FUNC(X) is a function that is similar to the objective function OBJ_FUNC(X), but may not completely match the objective function OBJ_FUNC(X).

In this case, one of the various probabilistic models may be used to define the surrogate function SURR_FUNC(X). For example, the surrogate function SURR_FUNC(X) may be defined as function that follows a probabilistic model called a Gaussian process.

A function that follows the Gaussian process is a function that outputs a normal distribution random variable for an arbitrary input. The function that follows the Gaussian process may be defined through 1) a mean function, which is a function representing the average of the output values for specific input values, and 2) a kernel function, which is a function representing the relationship and covariance matrix of given samples to estimate the surrogate function SURR_FUNC(X).

Through the surrogate function SURR_FUNC(X), a probability distribution for an arbitrary performance parameter of the memory system 100 may be derived.

The acquisition function ACQ_FUNC(X) may be determined based on the surrogate function SURR_FUNC(X). The acquisition function ACQ_FUNC(X) is a function used to determine, based on the probability distribution for the surrogate function SURR_FUNC(X), the value of a performance parameter of the memory system 100 which can be further optimize the objective function result which is better than the N candidate performance parameter values X1, X2, ~, XN-1, XN.

The acquisition function ACQ_FUNC(X) may be determined as a function considering both 1) exploitation criterion, which is a criterion that an optimal performance parameter value may exist near the N candidate performance parameter values X1, X2, ~, XN-1, XN that have already been searched for, and 2) exploration criterion, which is a criterion that the optimal performance parameter value may exist far from the N candidate performance parameter values X1, X2, ~, XN-1, XN.

A method of determining the acquisition function ACQ_FUNC(X) in consideration of the aforementioned two criteria may be variously determined. For example, a method of determining the acquisition function ACQ_FUNC(X) may be PI (Probability of Improvement) or EI (Expected Improvement).

In an embodiment of the present disclosure, the additional candidate performance parameter value XN+1 may be determined by a value of a performance parameter that minimizes the value of the acquisition function ACQ_FUNC(X). Hereinafter, this will be described in detail.

Referring to FIG. 8, the acquisition function ACQ_FUNC(X) may be determined as a function of i) a result of entering the performance parameter into the surrogate function SURR_FUNC(X) and ii) variance VARIANCE(X) of the result of entering the performance parameter into the surrogate function SURR_FUNC(X). As described above, since the surrogate function SURR_FUNC(X) is defined as a function following a probabilistic model, the result value of inputting a performance parameter value into the surrogate function SURR_FUNC(X) is also not fixed as a single value, but represented as a probability distribution. Accordingly, the variance VARIANCE(X) of the result value of inputting a performance parameter value into the surrogate function SURR_FUNC(X) may be derived.

For a performance parameter value near the N candidate performance parameter values X1, X2, ~, XN-1, XN, the result value of the surrogate function SURR_FUNC(X) may be similar to the N objective function results OBJ_FUNC(X1), OBJ_FUNC(X2), ~, OBJ_FUNC(XN-1), OBJ_FUNC(XN) that have already been calculated. Therefore, the variance VARIANCE(X) of the result value of the surrogate function SURR_FUNC(X) for the performance parameter value near the N candidate performance parameter values X1, X2, ~, XN-1, XN is small.

But, for a performance parameter value far from the N candidate performance parameter values X1, X2, ~, XN-1, XN, the result value of the surrogate function SURR_FUNC(X) may have a large difference from the objective function result of inputting the performance parameter value into the objective function OBJ_FUNC(X). Therefore, the variance VARIANCE(X) of the result value of the surrogate function SURR_FUNC(X) for the performance parameter value far from the N candidate performance parameter values X1, X2, ~, XN-1, XN is large.

According to the above-mentioned description, the acquisition function ACQ_FUNC(X) may be determined, for example, as follows.

$$ACQ\_FUNC(X) = SURR\_FUNC(X) - b*(VARIANCE(X))$$

In this case, b may be a predetermined weight value.

Therefore, by the variance VARIANCE(X) of the result of the surrogate function SURR_FUNC(X), the value of the acquisition function ACQ_FUNC(X) for a performance parameter value far from the N candidate performance parameter values X1, X2, ~, XN−1, XN may be less than the value of the acquisition function ACQ_FUNC(X) for a performance parameter value near the N candidate performance parameter values X1, X2, ~, XN−1, XN.

Referring to FIG. 9, if the acquisition function ACQ_FUNC(X) is determined, the performance optimization device 10 of memory system 100 may determine a performance parameter X that minimizes the value of the acquisition function ACQ_FUNC(X). The performance optimization device 10 of memory system 1000 may determine the value of the performance parameter X as the additional candidate performance parameter value XN+1.

Figure 11:
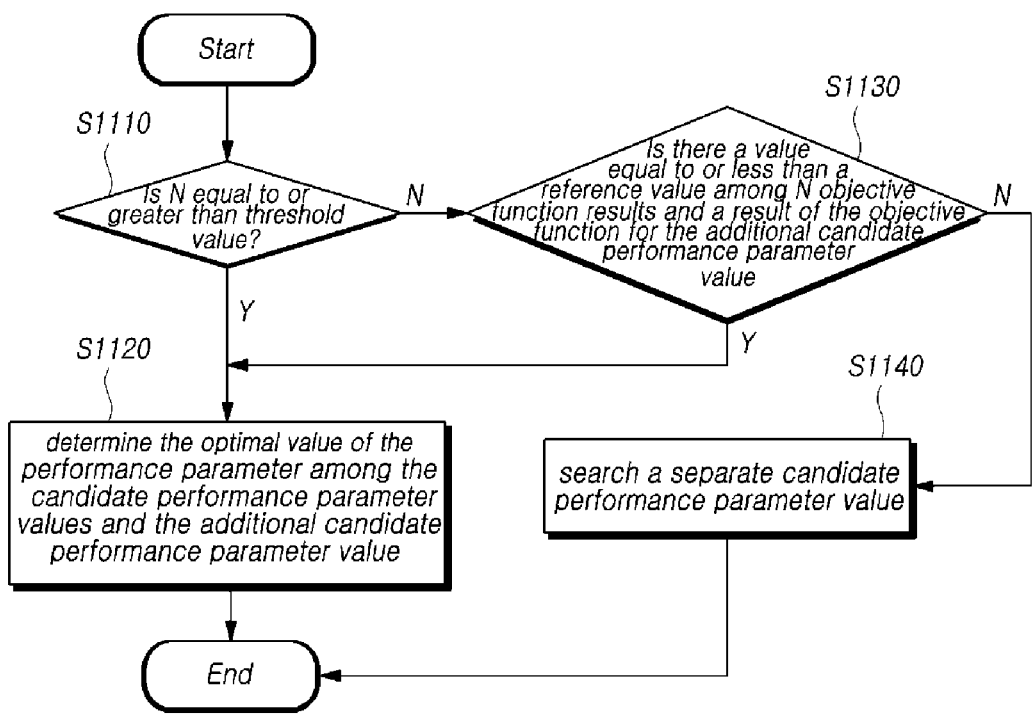

FIG. 10 to FIG. 11 are diagrams illustrating the performance optimization device 10 of memory system 100 determining an optimal value of the performance parameter of the memory system 100 based on an embodiment of the present disclosure.

Referring to FIG. 10, the computing processor 12, which is included in the performance optimization device 10 of memory system 100, may determine, based on i) the N objective function results OBJ_FUNC(X1), OBJ_FUNC(X2), ~, OBJ_FUNC(XN−1), OBJ_FUNC(XN) and ii) an objective function result OBJ_FUNC(XN+1) for the additional candidate performance parameter value XN+1, an optimal value of the performance parameter of the memory system 100 from among the candidate performance parameter values X1, X2, ~, XN−1, XN and the additional candidate performance parameter value XN+1.

When the optimal value of the performance parameter X of the memory system 100 is determined from among the candidate performance parameter values X1, X2, ~, XN−1, XN and the additional candidate performance parameter value XN+1, the computing processor 12 may determine, among the candidate performance parameter values X1, X2, ~, XN−1, XN and the additional candidate performance parameter value XN+1, the optimal value of the performance parameter X of the memory system 100 as a value corresponding to a minimum one of the N objective function results OBJ_FUNC(X1), OBJ_FUNC(X2), ~, OBJ_FUNC(XN−1), OBJ_FUNC(XN) and the objective function result OBJ_FUNC(XN+1).

On the other hand, the computing processor 12 may search, to determine the optimal value of the performance parameter X of the memory system 100, a separate candidate performance parameter value XN+2 other than the candidate performance parameter values X1, X2, ~, XN−1, XN and the additional candidate performance parameter value XN+1.

Hereinafter, an example of the operation of the aforementioned computing processor 12 will be described with reference to FIG. 11.

Referring to FIG. 11, the computing processor 12 may determine whether N is equal to or greater than the preset threshold value (S1110).

When N is equal to or greater than the threshold value (S1110-Y), the computing processor 12 may determine the optimal value of the performance parameter X of the memory system 100, from among the candidate performance parameter values X1, X2, ~, XN−1, XN and the additional candidate performance parameter value XN+1 based on the N objective function results OBJ_FUNC(X1), OBJ_FUNC(X2), ~, OBJ_FUNC(XN−1), OBJ_FUNC(XN) and the objective function result OBJ_FUNC(XN+1) for the additional candidate performance parameter value XN+1 (S1120).

On the other hand, when N is less than the threshold value (S1110-N), the computing processor 12 may determine whether there is a value equal to or less than a preset reference value among the N objective function results OBJ_FUNC(X1), OBJ_FUNC(X2), ~, OBJ_FUNC(XN−1), OBJ_FUNC(XN) and the objective function result OBJ_FUNC(XN+1) for the additional candidate performance parameter value XN+1 (S1130).

When there is a value equal to or less than the preset reference value (S1130-Y), the computing processor 12 may determine, among the candidate performance parameter values X1, X2, ~, XN−1, XN and the additional candidate performance parameter value XN+1, the optimal value of the performance parameter of the memory system 100 based on the N objective function results OBJ_FUNC(X1), OBJ_FUNC(X2), ~, OBJ_FUNC(XN−1), OBJ_FUNC(XN) and the objective function result OBJ_FUNC(XN+1) for the additional candidate performance parameter value XN+1 (S1120).

Furthermore, when there is no value equal to or less than the present reference value (S1130-N), the computing processor 12 may search, to determine the optimal value of the performance parameter of the memory system 100, a separate candidate performance parameter value other than the candidate performance parameter values X1, X2, ~, XN−1, XN and the additional candidate performance parameter value XN+1 (S1140).

Figure 12:
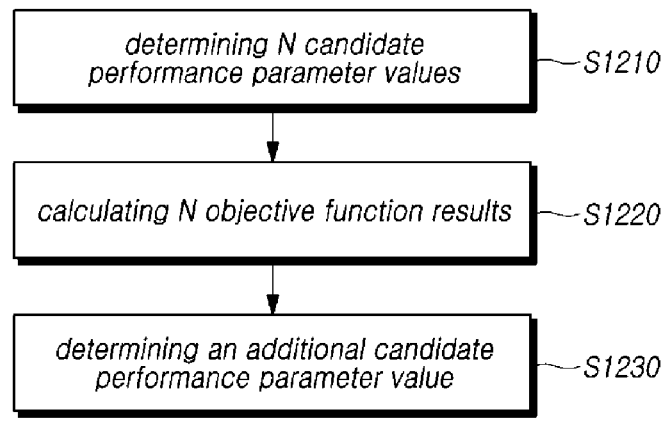
FIG. 12 is a diagram illustrating a method for operating a performance optimization device of memory system based on an embodiment of the present disclosure.

FIG. 12 is a diagram illustrating a method for operating a performance optimization device 10 of memory system 100 based on an embodiment of the present disclosure.

Referring to FIG. 12, a method for operating a performance optimization device 10 of the memory system 100 may include determining N, where N is a natural number, candidate performance parameter values X1, X2, ~, XN−1, XN for the performance parameter X of the memory system 100 (S1210).

The performance parameter X is, for example, a ratio at which the performance of operating of the memory system 100 based on a usage rate of a write buffer included in the memory system 100.

And the method for operating a performance optimization device 10 of the memory system 100 may include calculating N objective function results OBJ_FUNC(X1), OBJ_FUNC(X2), ~, OBJ_FUNC(XN−1), OBJ_FUNC(X) for an objective function OBJ_FUNC(X) defined for the memory system 100 (S1220). In this case, each of the N objective function results OBJ_FUNC(X1), OBJ_FUNC(X2), ~, OBJ_FUNC(XN−1), OBJ_FUNC(X) is the result of the objective function OBJ_FUNC(X) when measuring the memory system 100 by applying a corresponding one of the candidate performance parameter values X1, X2, ~, XN−1, XN to the memory system 100.

The objective function OBJ_FUNC(X) may be function of i) an average AVG_LATENCY of a plurality of latencies required for the memory system 100 to process a plurality of commands received from an external device (e.g., host HOST) and ii) a maximum value MAX_LATENCY of the plurality of latencies.

For example, the objective function OBJ_FUNC(X) may be a function representing a sum of i) a value obtained by multiplying the average AVG_LATENCY of a plurality of latencies by a first weight W1 and ii) a value obtained by multiplying the maximum value MAX_LATENCY of the plurality of latencies by a second weight W2.

The method for operating a performance optimization device 10 of the memory system 100 may include determining an additional candidate performance parameter value XN+1 for the performance parameter X of the memory system 100, based on the N candidate performance parameter values X1, X2, ~, XN−1, XN and the N objective function results OBJ_FUNC(X1), OBJ_FUNC(X2), ~, OBJ_FUNC(XN−1), OBJ_FUNC(X) (S1230).

For example, the additional candidate performance parameter value XN+1 may be determined, regarding an acquisition function ACQ_FUNC(X) based on a surrogate function SURR_FUNC(X) estimated based on the N candidate performance parameter values X1, X2, ~, XN−1, XN and the N objective function results OBJ_FUNC(X1), OBJ_FUNC(X2), ~, OBJ_FUNC(XN−1), OBJ_FUNC (XN), by a value of the performance parameter X that minimizes the value of the acquisition function ACQ_FUNC (X). In this case, the acquisition function ACQ_FUNC(X) may be a function of i) a result of entering the performance parameter X into the surrogate function SURR_FUNC(X) and ii) variance VARIANCE(X) of the result of entering the performance parameter X into the surrogate function SURR_FUNC(X).

The method for operating a performance optimization device 10 of the memory system 100 may further include determining, based on i) the N objective function results OBJ_FUNC(X1), OBJ_FUNC(X2), ~, OBJ_FUNC(XN−1), OBJ_FUNC(XN) and ii) the objective function result OBJ_FUNC(XN+1) for the additional candidate performance parameter value XN+1, an optimal value of the performance parameter X of the memory system 100 from among the candidate performance parameter values X1, X2, ~, XN−1, XN and the additional candidate performance parameter value XN+1.

The method for operating a performance optimization device 10 of memory system 100 may determine the optimal value of the performance parameter from among the candidate performance parameter values X1, X2, ~, XN−1, XN and the additional candidate performance parameter value XN+1 when i) N is equal to or greater than a preset threshold value or ii) there is a value equal to or less than a preset reference value among the N objective function results OBJ_FUNC(X1), OBJ_FUNC(X2), ~, OBJ_FUNC(XN−1), OBJ_FUNC(XN) and the objective function result OBJ_FUNC(XN+1) for the additional candidate performance parameter value XN+1.

Figure 13:
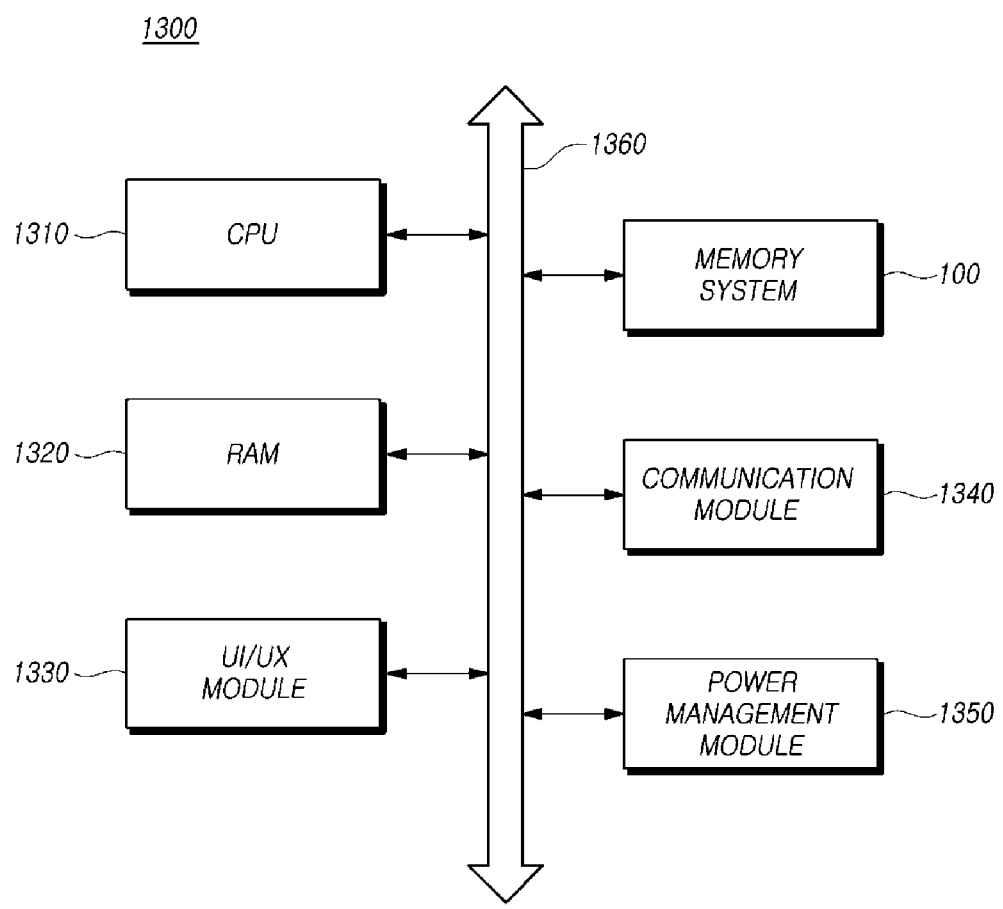
FIG. 13 is a diagram illustrating the configuration of a computing system based on an embodiment of the present disclosure.

FIG. 13 is a diagram illustrating the configuration of a computing system 1300 based on an embodiment of the present disclosure.

Referring to FIG. 13, the computing system 1300 based on an embodiment of the present disclosure may include: a memory system 100 electrically connected to a system bus 1360; a CPU 1310 configured to control the overall operation of the computing system 1300; a RAM 1320 configured to store data and information related to operations of the computing system 1300; a user interface/user experience (UI/UX) module 1330 configured to provide the user with a user environment; a communication module 1340 configured to communicate with an external device as a wired and/or wireless type; and a power management module 1350 configured to manage power used by the computing system 1300.

The computing system 1300 may be a personal computer (PC) or may include a mobile terminal such as a smartphone, a tablet or various electronic devices.

The computing system 1300 may further include a battery for supplying an operating voltage, and may further include an application chipset, a graphic-related module, a camera image processor, and a DRAM. Other elements would be apparent to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the present disclosure described above, the operation delay time of the memory system may be advantageously reduced or minimized. In addition, based on an embodiment of the present disclosure, an overhead occurring in the process of calling a specific function may be advantageously reduced or minimized. Although various embodiments of the present disclosure have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A method for operating a performance optimization device of a memory system, the method comprising:
determining N candidate performance parameter values for a performance parameter of the memory system, where N is a natural number greater than 0;
calculating N objective function results for an objective function defined for the memory system; and
determining an additional candidate performance parameter value for the performance parameter of the memory system, based on the N candidate performance parameter values and the N objective function results,
wherein each of the N objective function result is a result of the objective function, the result being measured when a corresponding one of the candidate performance parameter values is applied to the memory system, and
wherein the objective function is a function of an average of a plurality of latencies required for the memory system to process a plurality of commands received from an external device and a maximum value of the plurality of latencies,
wherein the average of a plurality of latencies is used to define throughput and the maximum value of the plurality of latencies is used to define delay time.

2. The method according to claim 1, wherein the performance parameter of the memory system is a rate at which the performance of operating of the memory system is changed based on a usage rate of a write buffer included in the memory system.

3. The method according to claim 1, wherein the objective function is a function representing a sum of a value obtained by multiplying the average of a plurality of latencies by a first weight and a value obtained by multiplying the maximum value of the plurality of latencies by a second weight.

4. The method according to claim 1, wherein the additional candidate performance parameter value is determined by a value of a performance parameter that minimizes a value of an acquisition function acquired based on a surrogate function estimated based on the N candidate performance parameter values and the N objective function results.

5. The method according to claim 4, wherein the acquisition function is a function of a result of entering the performance parameter into the surrogate function and variance of the result of entering the performance parameter into the surrogate function.

6. The method according to claim 1, further comprising determining, based on the N objective function results and an object function result corresponding to the additional candidate performance parameter value, an optimal value of the performance parameter of the memory system from among the candidate performance parameter values, and the additional candidate performance parameter value.

7. The method according to claim 6, wherein the optimal value of the performance parameter is determined from among the candidate performance parameter values and the additional candidate performance parameter value when N is equal to or greater than a preset threshold value or there is a value equal to or less than a preset reference value among the N objective function results and the object function result corresponding to the additional candidate performance parameter value.

8. A performance optimization device of a memory system, comprising:
    a storage memory for storing N candidate performance parameter values for a performance parameter of the memory system, where N is a natural number greater than 0; and
    a computing processor for calculating N objective function results for an objective function defined for the memory system and determining an additional candidate performance parameter value for the performance parameter of the memory system, based on the N candidate performance parameter values and the N objective function results,
    wherein each of the N objective function results is a result of the objective function, the result being measured when a corresponding one of the candidate performance parameter values is applied to the memory system, and
    wherein the objective function is a function of an average of a plurality of latencies required for the memory system to process a plurality of commands received from an external device and a maximum value of the plurality of latencies,
    wherein the average of a plurality of latencies is used to define throughput and the maximum value of the plurality of latencies is used to define delay time.

9. The performance optimization device of the memory system according to claim 8, wherein the performance parameter of the memory system is a rate at which the performance of operating of the memory system is changed based on a usage rate of a write buffer included in the memory system.

10. The performance optimization device of the memory system according to claim 8, wherein the objective function is a function representing a sum of a value obtained by multiplying the average of a plurality of latencies by a first weight and a value obtained by multiplying the maximum value of the plurality of latencies by a second weight.

11. The performance optimization device of the memory system according to claim 8, wherein the additional candidate performance parameter value is determined by a value of a performance parameter that minimizes a value of an acquisition function acquired based on a surrogate function estimated based on the N candidate performance parameter values and the N objective function results.

12. The performance optimization device of the memory system according to claim 11, wherein the acquisition function is a function of a result of entering the performance parameter into the surrogate function and a variance of the result of entering the performance parameter into the surrogate function.

13. The performance optimization device of the memory system according to claim 8, the computing processor determines, based on the N objective function results and an object function result corresponding to the additional candidate performance parameter value, an optimal value of the performance parameter of the memory system from among the candidate performance parameter values, and the additional candidate performance parameter value.

14. The performance optimization device of the memory system according to claim 8, wherein the computing processor determines the optimal value of the performance parameter from among the candidate performance parameter values and the additional candidate performance parameter value when N is equal to or greater than a preset threshold value or there is a value equal to or less than a preset reference value among the N objective function results and for the object function result corresponding to the additional candidate performance parameter value.

15. A memory controller, comprising:
    a working memory for storing N candidate performance parameter values for a performance parameter of a memory system including the memory controller, where N is a natural number greater than 0; and
    a processor for calculating N objective function results for an objective function defined for the memory system and determining an additional candidate performance parameter value for the performance parameter of the memory system, based on the N candidate performance parameter values and the N objective function results,
    wherein each of the N objective function results is a result of the objective function, the result being measured when a corresponding one of the candidate performance parameter values is applied to the memory system, and
    wherein the objective function is a function of an average of a plurality of latencies required for the memory system to process a plurality of commands received from an external device and a maximum value of the plurality of latencies,
    wherein the average of a plurality of latencies is used to define throughput and the maximum value of the plurality of latencies is used to define delay time.

16. A method of optimizing a system, the method comprising:
    modeling an object function of the system based on measured results and selected values of a parameter, the measured results being obtained by measuring a performance of the system that is set to the respective selected values;
    obtaining a probability distribution for the parameter by applying a probabilistic model on the object function;
    determining an acquisition function based on the probability distribution;
    estimating an additional value of the parameter through the acquisition function; and
    determining an optimal value of the parameter from among the selected value and the additional value based on the measured results and an additional result obtained by measuring the performance of the system that is set to the additional value, wherein the object function being expressed as a following equation,

[Equation]

$$OBJ\_FUNC(X) = (W1)*(AVG\_LATENCY) + (W2)*(MAX\_LATENCY)$$

where "OBJ_FUNC( )" represents the object function, "X" represents the parameter, "W1" and "W2" represent predetermined weights, "THROUGHPUT" represents a throughput of the system and is inversely proportional to an average of latencies respectively for a predetermined number of commands provided to the system and "MAX_LATENCY" represents a greatest one of the latencies.

* * * * *